E. W. BULLARD.
Horse Rake.
No. 74,794.  Patented Feb. 25, 1868.
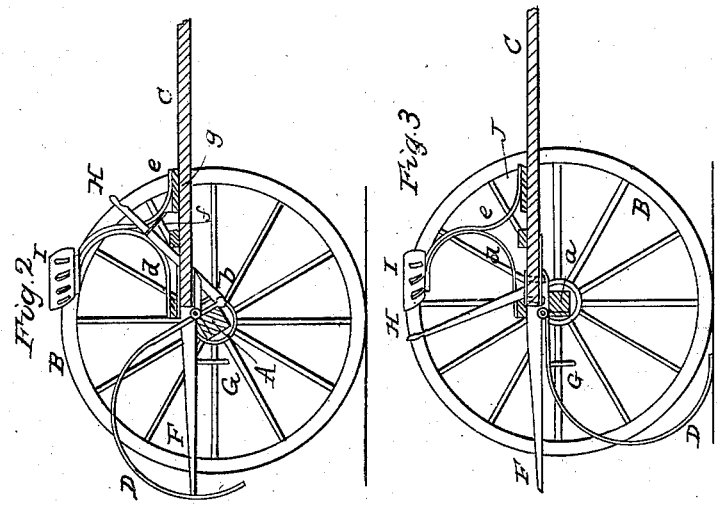
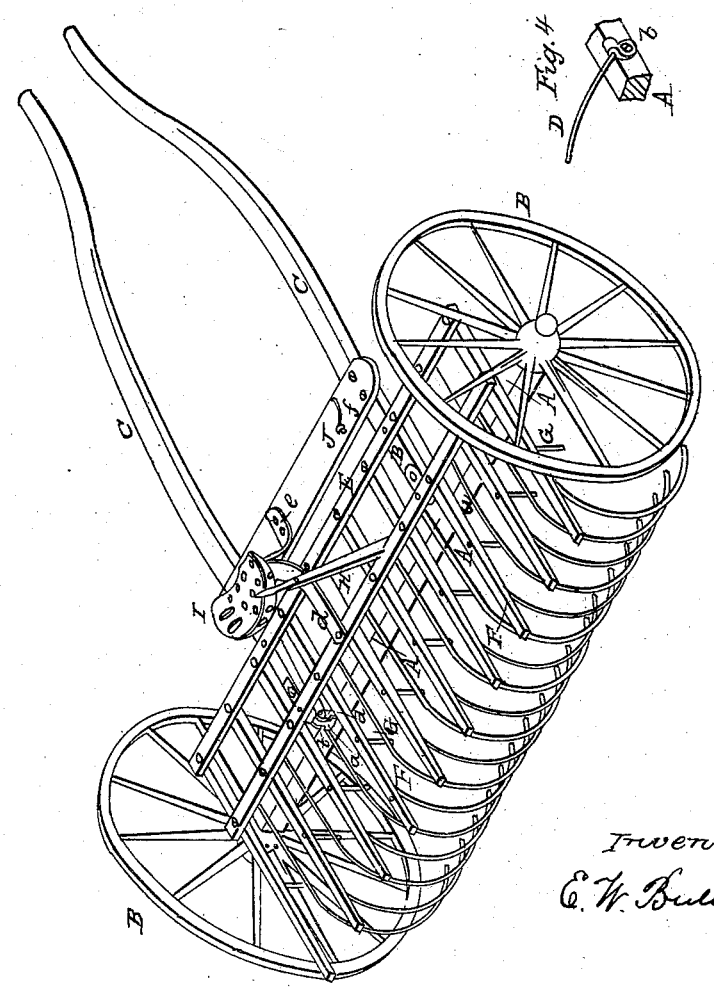

United States Patent Office.

E. W. BULLARD, OF BARRE, MASSACHUSETTS, ASSIGNOR TO HIMSELF AND J. W. JENKINS, OF SAME PLACE.

*Letters Patent No. 74,794, dated February 25, 1868.*

---

IMPROVEMENT IN HORSE-RAKES.

---

*The Schedule referred to in these Letters Patent and making part of the same.*

---

KNOW ALL MEN BY THESE PRESENTS:

That I, E. W. BULLARD, of Barre, in the county of Worcester, and Commonwealth of Massachusetts, have invented certain new and useful Improvements in Horse Hay-Rakes, of which the following is a full, clear, and exact description, reference being had to the accompanying drawings, forming a part of this specification, in which—

Figure 1 represents a perspective view of my improved rake.

Figure 2 represents a section on line A B, fig. 1, with the teeth raised; and

Figure 3 represents a similar section with the teeth lowered to the ground.

To enable those skilled in the art to which my invention belongs to make and use the same, I will proceed to describe it more in detail.

In the drawings, A is the axle supported by the wheels B B. The thills C C are hinged to the rear corner of the axle A. In this instance, metal pieces, $a$, are fastened to the back of the axle A, which are hinged between metal ears, 1 1, fastened to the thills. Any other proper device may be employed for the purpose, however. To the front of the axle is fastened a series of metal pieces, $b$, having holes in their upper ends, into which the upper bent ends of the teeth D are passed, and then headed down sufficiently to keep the hooked ends from slipping out, while at the same time allowing the teeth to rise and fall freely, to conform to the inequalities of the ground. Each tooth has an independent motion. The teeth are prevented from falling too low down by coming in contact with the top of the axle A. The cross-pieces E E are fastened to the rear of the thills C C, and to the under side of these are fastened the fingers F, which have short downwardly-projecting fingers or guards, G. To the front of the axle is fastened the lever H. The seat I is supported by two springs, $d\ e$, the lower end of the spring $d$ being fastened to the rear cross-piece, E, while that of the spring $e$ is fastened to the foot-board J. The upper ends of the springs are curved to fit each other, as fully shown in the drawings, and extend back under the bottom of seat I, to which they are fastened. This mode of supporting the driver's seat renders the connection strong, and yet communicates an easy motion to the driver when the rake is in operation.

When the rake is in operation, the hay is prevented, by the guards or fingers G, from being forced up or falling against the axle A, both when the teeth are down, and when raised, as shown in fig. 2, to discharge the hay. The fingers F prevent the hay from being carried up by the rake-teeth D. Thus, by the combined action of the swinging rake-teeth and stationary clearers, and vertical fingers attached to the clearers, the hay will be compressed and discharged in a compact form. The position of the vertical fingers remains unchanged while the rake-teeth are being lifted, so that while the hay is disengaged from the latter by the action of the clearers, the vertical fingers will still compress and keep it from being thrown forward toward the axle until, as just stated, it falls from the rake a compact windrow.

To discharge the hay, the driver forces lever H forward until the hinge of the thills has passed over the centre of the axle A, when the weight of the driver, combined with the pressure of the hay against the teeth D, completes the elevation of the teeth, as shown in fig. 2. When in the position shown in fig. 2, the lever H can be fastened by the hook $f$, so that the rake can be drawn from place to place without injury to the teeth.

The metal pieces $b$, into which the upper ends of the teeth D are hooked, may be made with a little spur to enter the axle, and thus obviate the necessity of more than one bolt or screw to hold them in place. In fig. 4, one of the teeth D and pieces $b$ are shown detached from the rake-head.

Having described my improved horse hay-rake, what I claim therein as new, and of my invention, and desire to secure by Letters Patent, is—

1. The combination, with a rake whose teeth are capable of being tilted or elevated in order to discharge the hay, of the stationary clearers F and vertical fingers G, operating in connection with the rake, substantially in the manner and for the purposes herein shown and set forth.

2. The combination, with the axle and the rake-teeth and thills, hinged to the axle as described, of the horizontal fingers F and short vertical fingers G, substantially in the manner and for the purposes shown and set forth.

E. W. BULLARD.

Witnesses:
    THOS. H. DODGE,
    D. L. MILLER.